United States Patent [19]

Kopp

[11] 4,061,045
[45] Dec. 6, 1977

[54] VARIABLE SPEED DRIVE MECHANISM

[76] Inventor: Jean Ernest Kopp, CH-3280, Meyriez, Murten, Switzerland

[21] Appl. No.: 718,768

[22] Filed: Aug. 30, 1976

[30] Foreign Application Priority Data

Sept. 11, 1975 Switzerland .................. 11831/75

[51] Int. Cl.$^2$ ................. F16H 13/02; F16H 13/04
[52] U.S. Cl. ........................................ 74/198; 74/200
[58] Field of Search ................. 74/198, 200, 796

[56] References Cited

U.S. PATENT DOCUMENTS

| | | | |
|---|---|---|---|
| 2,920,505 | 1/1960 | Hine | 74/796 |
| 3,154,957 | 11/1964 | Kashihara | 74/198 |
| 3,246,531 | 4/1966 | Kashihara | 74/200 |
| 3,287,994 | 11/1966 | Kotik | 74/796 |
| 3,504,574 | 4/1970 | Okabe | 74/796 |
| 3,793,907 | 2/1974 | Nakamura et al. | 74/198 |

*Primary Examiner*—Samuel Scott
*Assistant Examiner*—Allan R. Burke
*Attorney, Agent, or Firm*—Larson, Taylor and Hinds

[57] ABSTRACT

A drive mechanism is described that provides a speed ratio that is infinitely variable between predetermined limits. Coaxial driving and driven shafts carry discs formed with frusto-conical friction surfaces arranged face-to-face with control spheres in frictional engagement with these surfaces and equidistantly distributed round the discs. Each control sphere has an annular groove in which rolling elements of a rolling bearing run. Each bearing is mounted on one face of a control segment formed on the opposite face with an arcuate surface which rolls on the base of a groove in an adjusting ring, concentric with the shafts, when the adjusting ring undergoes axial movement. Each control surface has a spherical journal that projects into a bore in the adjusting ring so as to ensure such rolling action when the ring is adjusted to vary the speed ratio, which variation results from the consequent variation of the angular dispositions of the control segments, whose arcuate surfaces are centered on the centers of the control spheres. The adjusting ring may be outside the assemblies of control spheres, rolling bearings and segments, or inside these assemblies. Two means are described whereby the torque reaction of the transmission maintains the control spheres in good frictional contact with the discs.

9 Claims, 6 Drawing Figures

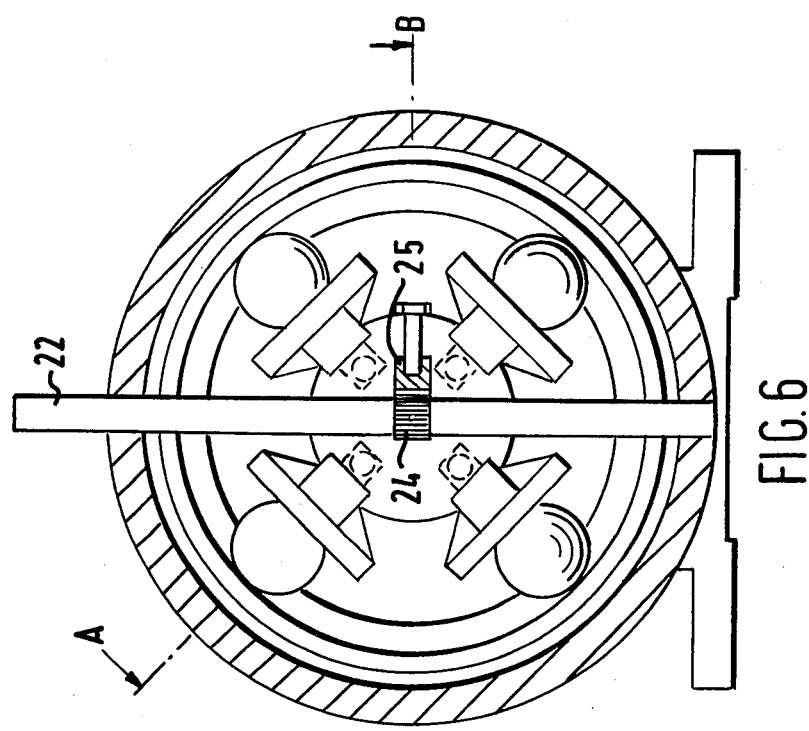
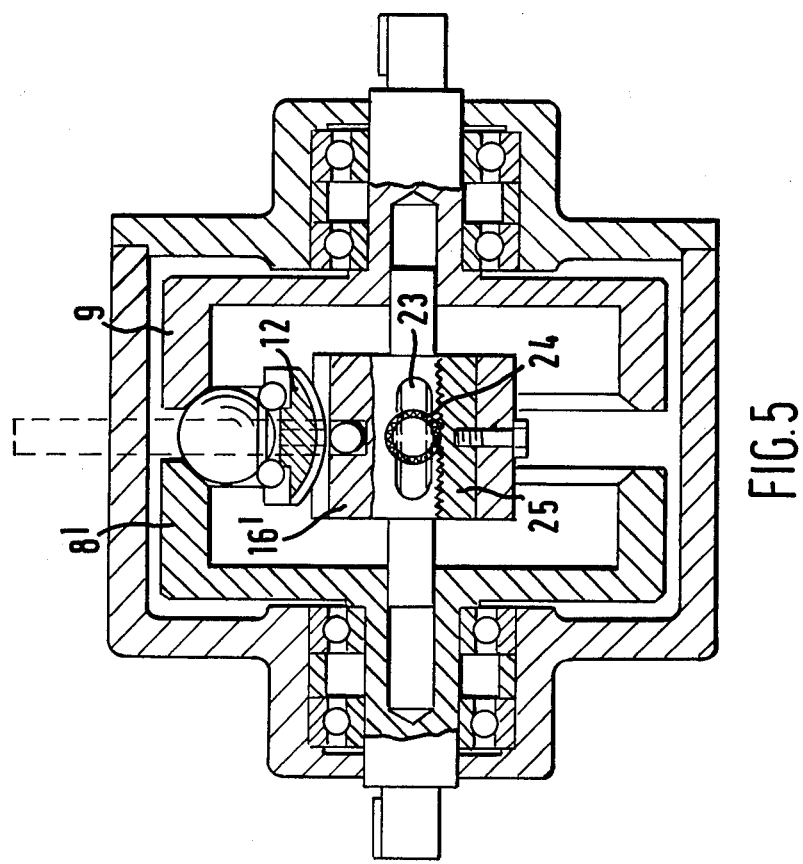

VARIABLE SPEED DRIVE MECHANISM

FIELD OF THE INVENTION

This invention relates to drive mechanisms providing a speed ratio that is infinitely variable between predetermined limits, that is to say drive mechanisms in which the speed ratio can be changed continuously by infinitely small amounts and not in discrete steps.

DESCRIPTION OF THE PRIOR ART

Variable speed drive mechanisms are well known wherein coaxial input and output shafts respectively carry disc-like members having friction surfaces that face one another with runners or roller elements interposed between the surfaces and distributed equidistantly about the shaft axis so that rotation of one member causes the other member to rotate in the opposite direction. The runners rotate about axes that are fixed for any set speed ratio but the surfaces and runners are so shaped that the speed ratio can be varied by simultaneously altering the axes of the runners.

SUMMARY OF THE INVENTION

An object of the present invention is to provide a drive mechanism as aforesaid that has a large control range from a condition in which one disc-like member is stationary through a 1:1 ratio to the condition in which the other disc-like member is stationary, while transmitting substantial torque in relation to the size of the mechanism. A further object is to provide a simple mechanism through which substantial forces are transmitted without setting up dangerously high stresses.

According to the present invention a drive mechanism comprises a driven and a driving shaft in coaxial arrangement and control spheres which coact with coaxial rotating friction surfaces on driving and driven members, a control segment with rolling bearings being associated with each control sphere and all control segments abutting against a common adjusting ring, and each control segment being shaped with an arcuate abutment surface the center of which coincides with the center of the sphere and a spherical journal being in engagement with a bearing in the adjusting ring whereby axial shifting of the adjusting ring causes continuous variation of the transmission ratio between the driving shaft and the driven shaft.

DESCRIPTION OF THE DRAWINGS

Examples of the invention are shown in the accompanying drawings, wherein:

FIG. 5 shows an axial cross-section (taken on line A—B of FIG. 6) through another infinitely variable friction drive mechanism; and FIG. 6 shows a transverse cross-section through the mechanism of FIG. 5.

Figure 2:
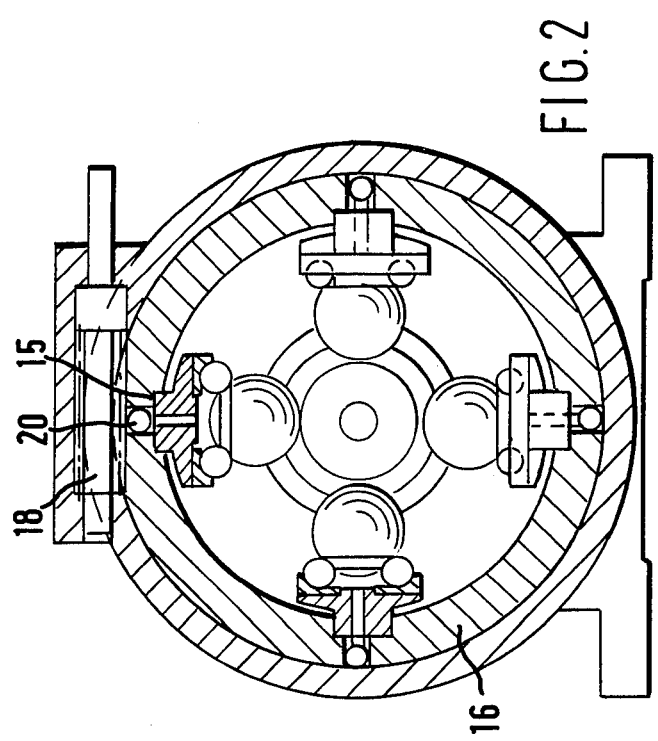
FIG. 2 shows a transverse cross-section through the mechanism of FIG. 1.
Figure 1:
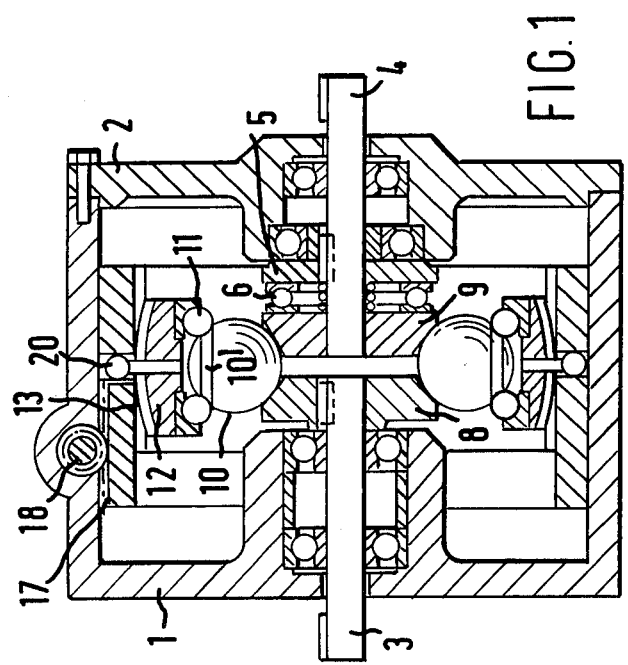
FIG. 1 shows an axial cross-section through an infinitely variable friction drive mechanism.
Figure 3:
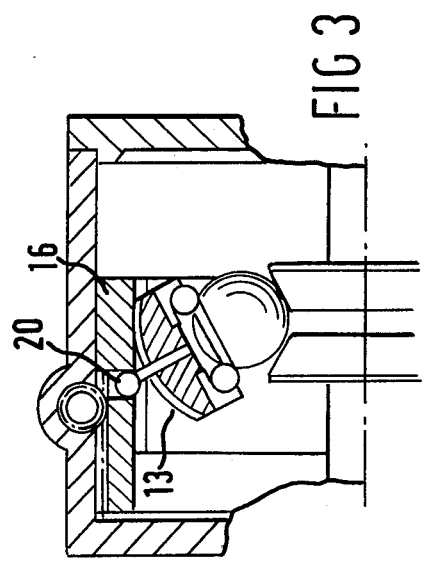
FIG. 3 shows a portion of the cross-section of FIG. 1, but with the mechanism set for a different speed ratio.

In the example of FIGS. 1 to 3, a friction disc 8 is fixed to a shaft 3 supported for rotation in housing 1 closed at one end by a cover 2. In the cover 2, there is rotatably supported shaft 4 on which a disc 9 is free to rotate and a thrust disc 5 is fixed by means of splines. The front face of disc 5 is provided with ramps. Identical ramps are provided on disc 9 and balls 6 are mounted to travel along the ramps to form a device for automatically producing pressure on disc 9 when torque is applied to disc 9 about the axis of shaft 4. Such automatic thrust devices are known and described for example in Swiss patent specification No. 257,632.

Control spheres 10 are in frictional contact with discs 8 and 9, and abut against control segments 12 via rolling bearings 11. Each control sphere 10 is formed with an annular groove 10' along which the rolling elements in the associated bearing 11 roll and thereby force the control sphere to rotate around the rotation axis of the bearing. This control segment 12 has an arcuate surface 13 the center of which is at the center of the control sphere. The control segment 12 is shaped laterally to fit into a groove 15 against the base of which it abuts. The groove 15 is parallel to the common axis of shafts 3, 4 and formed in an adjusting ring 16 mounted to slide axially in but not to rotate in the housing 1. An adjusting shaft 18 rotatable in the housing 1 carries a pinion with elongated teeth in engagement with teeth 17 on adjusting ring 16. By the rotation of the shaft, the adjusting ring 16 is shifted axially.

Each control segment 12 comprises a spherical head 20 which is in engagement with a bore of the adjusting ring 16. Upon axial shifting of the adjusting ring 16, the control segment 12 rolls in the associated groove 15 as shown in FIG. 3. In FIG. 1, the control segment 12 is shown in its central position from which it may swivel either to the left or to the right. In the central position shown in FIG. 1, the transmission ratio between disc 8 and disc 9 is 1:1 and turning the control segment 12 about the centre of its control sphere 10 causes a modification of the transmission ratio between disc 8 and disc 9 which is due to the shorter distance between the rotation axis of the control sphere 10 and the point of contact of the control sphere with one of the discs and the larger distance between the rotation axis of the control sphere and the point of contact of the control sphere with the other disc, as shown in FIG. 3.

When the movement of the control segments 12 is so large that the axis of rotation of each control sphere 10 coincides with the point of contact of the sphere with one disc, an infinite speed ratio of 1 : zero is obtained.

Figure 4:
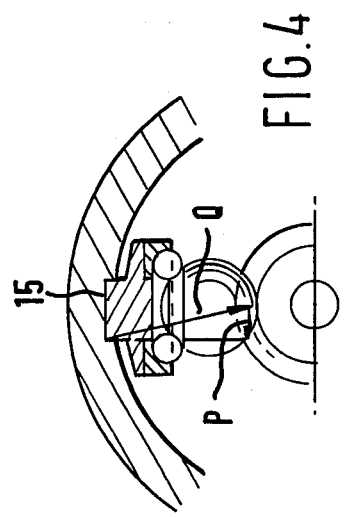
FIG. 4 shows a transverse cross-section through part of a modification of the mechanism of FIGS. 1 to 3.

FIG. 4 shows a thrust device which may be used instead of the thrust device designated by reference numerals 5 and 6. Herein, "P" represents the reaction force from the torque of shafts 3 and 4 onto a control sphere 10 since one of the shafts rotates inversely with respect to the other. The reaction force "P" acts on one side face of groove 15 and thereby produces a component "Q" towards discs 8 and 9. This component is proportional with the force "P" and the transmitted torque. It produces the frictional pressure between control sphere 10 and discs 8 and 9 for the transmission of the driving force. In this embodiment, the device 5, 6 is unnecessary and the disc 9 may be fixed directly on shaft 4 instead of being freely rotatable thereon.

In the embodiment shown in FIGS. 5 and 6, each control segment 12 is arranged towards the middle of the drive mechanism, and discs 8' and 9' exert a thrust on the segment 12 in the radially inward direction. The control segments 12 abut against an adjusting ring 16'. An adjusting shaft 22 extends transversely through the drive mechanism and holds the adjusting ring 16' against rotation by engaging a longitudinal groove 23 on one side. On the other side of the adjusting ring, gear teeth 24 on the shaft 22 engage a rack 25 arranged so that upon rotation of this shaft 22 in the same manner as the adjusting shaft 18 of FIG. 1, the adjusting ring 16' is moved axially with respect to the drive mechanism.

The function of this embodiment of FIGS. 5, 6 is in principle the same as that of FIGS. 1 to 3, and the automatic thrust arrangement of FIG. 4 may also be used in this embodiment of FIGS. 5, 6.

The advantages of the present invention consist in the greater simplicity of the drive combined with a large control range. A substantial number of control spheres may be arranged around the discs 8, 9, the control spheres transmitting power simultaneously whereby larger energies may be transmitted within a mechanism of smaller dimensions. The power transmission does not result in any forces being transmitted to the control that necessitate the use of any but a small force to change the speed ratio.

I claim:

1. A drive mechanism providing a speed ratio that is infinitely variable between predetermined limits, the mechanism comprising a casing, driving and driven shafts mounted to rotate in said casing about a common axis fixed with respect to said casing, driving and driven members respectively mounted for rotation with said shafts and respectively formed with frusto-conical friction surfaces facing one another for supporting a control sphere therebetween, at least one control sphere mounted between said surfaces in frictional engagement therewith, a circular rolling bearing assembly engaged by a portion of said sphere remote from said surfaces, said circular rolling bearing assembly having its axis passing through the centre of said control sphere, an adjusting member mounted in said casing for linear to-and-fro movement parallel to said axis, a control segment interposed between said rolling bearing assembly and said adjusting member, said control segment being formed with an arcuate surface on a side thereof remote from said rolling bearing assembly, said arcuate surface being centred on the center of said control sphere, said adjusting member being formed with a flat surface in contact with said arcuate surface, and said adjusting member and said control segment being formed with interengaging elements arranged for said arcuate surface to roll on said flat surface when said adjusting member undergoes said linear movement, and means for effecting said linear movement, thereby angularly adjusting said axis of said rolling bearing assembly with respect to said common axis of said shafts to vary said speed ratio.

2. A drive mechanism according to claim 1, comprising a series of transmission assemblies, one said transmission assembly comprising said control sphere, said rolling bearing assembly and said control segment, said transmission assemblies being similar to one another and distributed equidistantly about said friction surfaces, and said adjusting member being an adjusting ring mounted coaxially with said shafts and formed with as many flat surfaces as there are transmission assemblies respectively for contact with the arcuate surfaces on the control segments in said transmission assemblies.

3. A drive mechanism according to claim 2, in which each control sphere of said transmission assemblies is formed on its surface with an annular groove and in which each rolling bearing assembly in said transmission assembly comprises rolling elements in rolling contact with said annular groove.

4. A drive mechanism according to claim 1, in which said control segment is formed with a projection of the side of said arcuate surface remote from said control sphere, said adjusting member being formed with a bore and said projection being formed with a spherical head projecting into said bore, said spherical head and bore constituting said interengaging elements.

5. A drive mechanism according to claim 2, wherein said flat surfaces consist of base surfaces of grooves of rectangular section formed in said adjusting ring parallel to said shafts, said control segments being formed with lateral surfaces in sliding contact with the sides of said grooves.

6. A drive mechanism according to claim 2, wherein said flat surfaces consist of base surfaces of grooves of rectangular section formed in said adjusting ring parallel to said shafts, said control surfaces being formed with lateral surfaces arranged to react against the side surfaces of said grooves during torque transmission between said shafts to maintain friction pressure between the control spheres and said friction surfaces.

7. A drive mechanism according to claim 2, wherein said adjusting ring encircles the control segments and is in sliding engagement with an interior surface of said casing.

8. A drive mechanism according to claim 2, wherein said adjusting ring is located with said transmission assemblies on the outside thereof.

9. A drive mechanism according to claim 2, wherein said adjusting ring is located with said transmission assemblies on the outside thereof, and said adjusting ring is formed on one side with a slot parallel to the axis of said shafts and provided on the other side with a rack, said means for effecting said linear movement comprising a rotatable adjusting shaft passing through said slot to prevent rotation of said adjusting ring and having a pinion meshing with said rack for moving said adjusting ring axially.

* * * * *